United States Patent
Vanluchene et al.

(10) Patent No.: US 12,403,847 B2
(45) Date of Patent: Sep. 2, 2025

(54) SKIN FOR A VEHICLE INTERIOR TRIM PART CONTAINING AN OPERATING ELEMENT

(71) Applicant: ASCORIUM GMBH, Königswinter (DE)

(72) Inventors: Yvan Vanluchene, Wetteren (BE); Geert Trossaert, Wetteren (BE)

(73) Assignee: ASCORIUM GMBH, Konigswinter (DE)

( * ) Notice: Subject to any disclaimer, the term of this patent is extended or adjusted under 35 U.S.C. 154(b) by 287 days.

(21) Appl. No.: 17/785,526

(22) PCT Filed: Jan. 13, 2021

(86) PCT No.: PCT/EP2021/050526
§ 371 (c)(1),
(2) Date: Jun. 15, 2022

(87) PCT Pub. No.: WO2021/144286
PCT Pub. Date: Jul. 22, 2021

(65) Prior Publication Data
US 2023/0011608 A1     Jan. 12, 2023

(30) Foreign Application Priority Data
Jan. 16, 2020 (EP) ..................... 20152318

(51) Int. Cl.
*B60R 13/02* (2006.01)
*B29C 45/00* (2006.01)
(Continued)

(52) U.S. Cl.
CPC ...... *B60R 13/0256* (2013.01); *B29C 45/0053* (2013.01); *B32B 3/263* (2013.01);
(Continued)

(58) Field of Classification Search
CPC . B60R 13/0256; B60R 13/0243; B32B 3/263; B32B 3/30; B32B 2605/003
See application file for complete search history.

(56) References Cited

U.S. PATENT DOCUMENTS

| 5,448,028 | A | 9/1995 | Filion et al. |
| 7,638,719 | B2 | 12/2009 | Pelletier et al. |

(Continued)

FOREIGN PATENT DOCUMENTS

| DE | 102006061388 B3 | 4/2008 |
| EP | 0303305 A2 | 2/1989 |

(Continued)

*Primary Examiner* — Joanna Pleszczynska
(74) *Attorney, Agent, or Firm* — FISHERBROYLES, LLP; Roger L. Browdy; James E. Mrose (57) ABSTRACT

The skin (1) comprises at least an outer elastomeric layer (5) with an inner surface and an outer surface and at least one operating element (8A) which is adhered to the inner surface of the outer skin layer (5). The operating element (8A) is intended to be connected to an electric or electronic component to enable to control the operation of this component. In order to indicate the location of the operating element (8A) in the skin (1) with a minimal distortion of the visual appearance of the skin, the operating surface (9) of the operating element (8A) extends in a first area (11) of the visible surface of said skin (1), which first area (11) has a first surface texture which is different from the surface texture of the surrounding area (12) of the visible surface of the skin. Both textures may in particular produce a different gloss and the first area (11) may further be provided with surface relief elements (16, 17).

20 Claims, 5 Drawing Sheets

(51) Int. Cl.
*B32B 3/26* (2006.01)
*B32B 3/30* (2006.01)
*B32B 5/18* (2006.01)
B29K 75/00 (2006.01)
B29L 31/30 (2006.01)

(52) U.S. Cl.
CPC ............ *B32B 5/18* (2013.01); *B60R 13/0243* (2013.01); *B29K 2075/00* (2013.01); *B29L 2031/3041* (2013.01); *B32B 2307/732* (2013.01); *B32B 2605/003* (2013.01)

(56) References Cited

U.S. PATENT DOCUMENTS

| | | |
|---|---|---|
| 2006/0099395 A1 | 5/2006 | Cowelchuk |
| 2006/0134381 A1* | 6/2006 | Homburg ............ B60R 13/0256 428/141 |
| 2007/0077374 A1 | 4/2007 | Cowelchuk |
| 2019/0326908 A1 | 10/2019 | Salter |

FOREIGN PATENT DOCUMENTS

| | | |
|---|---|---|
| EP | 0376246 A2 | 7/1990 |
| EP | 0929586 A1 | 7/1999 |
| EP | 2275307 A1 | 1/2011 |
| WO | 9814492 A1 | 4/1998 |
| WO | 2004000905 A1 | 12/2003 |
| WO | 2007137623 A1 | 12/2007 |

\* cited by examiner

SKIN FOR A VEHICLE INTERIOR TRIM PART CONTAINING AN OPERATING ELEMENT

The present invention relates to a skin for a vehicle interior trim part. The skin comprises at least an outer elastomeric layer with an inner surface and an outer surface which forms the visible surface, i.e. the so-called A-surface, of the skin. The skin further comprises at least one operating element which has an operating surface and which is adhered to the inner surface of the outer layer of the skin. The operating element is intended to be connected to an electric or electronic component to enable to control the operation of this component.

An automotive vehicle such as a car or a truck comprises a lot of electric or electronic components which can be controlled by the driver or passenger. The operating elements such as buttons, switches and sliders used to control the operation of these components are usually mechanically mounted individually or as assemblies in openings in the trim part itself. In between the areas with operating elements, the trim part usually comprises areas formed by an elastomeric skin with optionally other functional or aesthetic parts integrated in the skin. On its outer surface, the elastomeric skin has a surface texture. This texture may be intended to imitate leather but it can also be intended to reduce the gloss of the skin material. This may be important for example on the top of a dashboard to avoid too strong light reflections.

The operating elements may be adhered to the back of the elastomeric skin. In the method disclosed in DE 10 2006 061 388 this is done by producing the skin in accordance with a powder slush process against a mould surface and by applying the operating element against the back of the powder slush skin when the skin material has not yet completely cured. In this way, the operating element adheres to the skin by the adhesive properties of the curing skin material. In a similar method disclosed in EP 2 275 307 the operating element is applied against the back of a first polyurethane skin layer before the reactive material used to produce this skin layer is completely cured. Subsequently a further polyurethane skin layer is sprayed against the back of the first skin layer, and against the back of the operating element, to embed the operating element in the elastomeric polyurethane skin.

In recent years, there has been an increasing interest in integrating operating elements in the skin in a way that they are almost invisible. Reference can be made for example to U.S. Pat. No. 7,638,719 and US 2019/0326908.

In U.S. Pat. No. 7,638,719 the operating element is a pressure-sensitive element which is covered by the flexible skin material. Since it is in this way invisible to the user, assignment fields are provided on the outer surface of the skin to indicate the presence of the operating elements.

In US 2019/0326908 a proximity sensor and a light source are arranged on the back of the skin. By means of an icon layer in between the light source and the skin, indicia can be projected onto the skin. The switch assembly is thus hidden unless activated to luminesce by means of the light source. A problem with such a hidden arrangement is that in daylight, when the light source is not activated, the user cannot see the presence or the location of any of the operating elements.

In U.S. Pat. No. 5,448,028 this problem is solved by spraying indicia on the outer surface of the skin or by shaping the skin layer so that the skin layer forms an elevated portion, in the form of a switch or button, at the location of the switch or an indent or a depression around the switch. A problem with shaping the skin layer in this way is that the design freedom is quite limited and that a fine but clear indication of the location of the switch is not possible. As a result, the visual appearance of the skin may be considerably disturbed by the visual indication of the location of the switch.

An object of the present invention is therefore to provide a new skin with an operating element wherein the location of the operating element, more particularly of the operating surface thereof, can be indicated with a minimal distortion of the visual appearance of the skin.

To this end, the skin according to the present invention is characterised in that the operating surface of said operating element extends in a first area of the visible surface of said skin which is at least partially surrounded by a second area of the visible surface of said skin, the outer surface of said outer layer having in at least a portion of said first area a first surface texture and in said second area a second surface texture which is different from said first surface texture. The operating element is in particular configured to be connected to an electric or electronic component to enable a user to control the operation of this electric or electronic component.

The texture of the surface of the skin are the visual or tactile surface characteristics of this surface and the appearance thereof. The surface of the skin may be quite rough or it may be completely smooth. Even in case the surface is completely smooth or flat, this is considered to be a textured surface, i.e. also the absence of any texture is considered to be a texture.

The texture is formed by the surface of the outer elastomeric layer but not by the shape of the outer elastomeric layer itself. When shaping the elastomeric layer, the shape of the outer surface of the elastomeric layer is generally a negative of the shape of the inner surface. The texture of the outer surface is, on the contrary, independent of the texture of the inner surface of the elastomeric layer. In practice, the inner surface of the elastomeric layer may be a smooth surface whilst the outer surface may present a rougher surface texture.

More specifically, the texture comprises in particular those characteristics of the surface which have an effect on the gloss of the surface.

Since the surface texture is defined by the outer surface of the outer elastomeric layer itself, the shape or form of the outer elastomeric layer does not need to be modified to indicate the presence of the operating surface of the operating element. This means that the shape or form of the visible surface of the skin does not have to be distorted to provide an indication of the location of the operating surface of the operating element. Instead, only the surface texture of the outer surface of the outer layer has to be modified. In other words the general outline and visual appearance of the visible surface of the skin can be maintained.

The surface texture of the outer surface of the outer elastomeric layer is preferably a moulded surface texture, i.e. a surface texture which is obtained by moulding the outer elastomeric layer against a textured mould surface. The outer elastomeric layer may be made of a thermoplastic material which is moulded in a molten state against the mould surface, such as in the slush moulding process. Alternatively, a layer (foil) of such a thermoplastic material may be moulded in a solid state against the mould surface. The solid layer of thermoplastic material is moulded by urging or sucking it with a sufficient pressure against the textured mould surface so that the negative texture on the mould surface is transferred onto the skin layer. The skin layer and/or the mould surface is preferably heated to assist the moulding process. The elastomeric layer may also be produced from a reactive mixture, for example a polyurethane reactive mixture, which is applied in a liquid state against the textured mould surface and which is allowed to cure against this mould surface.

Preferably, the second surface texture is visually distinct from the first surface texture. This can be achieved in different ways. One of the textures can for example be a coarse texture whilst the other texture is a finer texture. Both textures may also be coarse but may comprise other texture elements which have a different shape. Alternatively or additionally, both textures may have different light reflecting properties so that the differently textured areas have a different gloss. One area may for example be matt whilst the other area may be more glossy.

An important advantage of distinguishing the first and the second area of the visible surface of the skin by means of a different surface texture is that such different surface textures can easily be obtained, without any additional process steps, by moulding the outer elastomeric layer against a mould surface which is provided with a negative of the first and the second surface texture.

In an embodiment of the skin according to the invention, said portion of said first area forms a visible sign indicating the presence of the operating surface of said operating element.

The visible sign may be a symbol or an icon. It may also be a letter or a numeral, with a number of letters or numerals formed by different portions of the first area, forming preferably a word or even a text or a number.

In an embodiment of the skin according to the invention, the outer surface of said outer elastomeric layer has in said first area at least one surface relief element forming a visible sign indicating the presence of the operating surface of said operating element, which surface relief element comprises at least one depression in said outer surface, where the outer elastomeric layer has a reduced thickness, and/or at least one elevation on said outer surface, where the outer elastomeric layer has an increased thickness.

The visible sign formed by the surface relief element may be a symbol or an icon. It may also be a letter or a numeral, with a number of letters or numerals formed by different portions of the first area, forming preferably a word or even a text or a number.

Just as the first and the second surface texture, the surface relief elements are not formed by the shape or the form of the outer elastomeric layer itself but they are formed as elevations on or as depressions in the outer surface of the outer elastomeric layer. The surface relief elements are therefore generally only visible on one side of the outer layer, namely on the outer (visible) surface thereof. The surface relief element or elements can be distinguished individually (visually but preferably also tactilely) and appear therefore as individual elements on the outer surface of the outer elastomeric layer.

In an embodiment of the skin according to the present invention with at least one surface relief element in said first area, the surface relief element or elements cover therefore preferably less than 50%, more preferably less than 40% and more in particular less than 30% of the surface of said first area. In this way, they are separated by a substantial distance from one another.

Preferably, said depression and/or elevation produces a height difference on said outer surface of at least 0.10 mm and preferably of at least 0.15 mm. The height difference can even be larger and may be larger than 0.20 mm, larger than 0.25 mm or larger than 0.30 mm.

Such a height difference makes the surface relief elements better individually distinguishable. The height difference is determined as the maximum vertical height difference between the surface relief element and the surface area right next to the surface relief element. In case the surface relief element is an elevation which is situated right next to a surface relief element formed by a depression, the height difference produced by the elevation, or the height difference produced by the depression, is the height difference between the top of the elevation and the bottom of the depression measured on the profile in a plane perpendicular to the outer surface of the outer layer.

Preferably, said surface relief element has a projected surface area on a flat plane tangent to the outer surface of said outer elastomeric layer of at least 1 $mm^2$, preferably of at least 2 $mm^2$.

This also assists in making the surface element individually distinguishable.

In an embodiment of the skin according to the present invention with at least one surface relief element in said first area, at least a portion of the surface of said surface relief element has said first surface texture.

By the different texture of the surface of the surface relief element and the surface of the second area of the visible surface of the skin, the surface relief element thus becomes more distinguishable from the second area of the visible surface. This feature therefore assists in indicating more clearly the location of the operating surface of the operating element.

In an embodiment of the skin according to the present invention with at least one surface relief element in said first area, the outer surface of said outer layer has in at least a portion of said first area next to said surface relief element said first surface texture.

By the different texture of the surface of the first area next to the surface relief element, or in between the surface relief elements in case several surface relief elements are present in the first area, and the surface of the second area of the visible surface of the skin, the first area can be distinguished more easily from the second area or in other words the location of the surface relief element is indicated more clearly on the visible surface of the skin.

In another embodiment of the skin according to the present invention with at least one surface relief element in said first area, at least a portion of the surface of said surface relief element and at least a portion of said first area next to said surface relief element have said first surface texture. In this way, a larger portion of the first area, or preferably even substantially the entire first area, has said first surface texture and can thus be distinguished more easily, as a whole, from the second area of the visible skin surface to have a clear indication of the location of the operating surface of the operating element.

In an embodiment of the skin according to the present invention, said second surface texture differs from said first surface texture to produce a difference in gloss value between the portion of said first area, which has said first texture, and the second area, which has said second surface texture, said second surface texture having in particular a different roughness and/or a profile with a different root mean square slope value than said first surface texture.

A difference in gloss assists in distinguishing the first area from the second area of the visible surface of the skin. As the difference in gloss is produced by the surface texture, no additional post processing steps such as post painting or other post surface treatment of the produced skin is required to obtain this difference. An advantage of a difference in gloss is that it is a clear visual indication of the difference in surface texture. A further advantage is that it is linked with another haptic feel. The driver can thus feel the texture difference so that he does not have to look at the skin to see the exact location of the operating surface of the operating element.

The gloss value of the first and the second area can be measured in accordance with ASTM D523-14(2018). The roughness of the surface textures, in particular the roughness Ra, can be measured as defined in DIN EN ISO 4287:1998 and also the root mean square slope value, in particular the delta q value Rdq, can be determined in accordance with DIN EN ISO 4287:1998. The greater the surface roughness Ra, i.e. the higher the peaks and the deeper the valleys, and/or the greater the delta q value, i.e. the steeper the slopes, the smaller the specular reflection of the light, or in other words the less light is reflected into the eyes, and hence the lower the gloss of the skin surface.

In an embodiment of the skin according to the present invention, said first surface texture is smoother than said second surface texture to provide a higher gloss to the portion of said first area which has said first surface texture, the second area of the skin having in particular a gloss value, measured in accordance with ASTM D523-14(2018) under an angle of 60°, smaller than 2.0, more particularly smaller than 1.5.

A more glossy area allows to clearly distinguish it from the surrounding area, especially when the surrounding area is a matt area. Especially for a matt area having a gloss value of less than 2.0, or even less than 1.5 gloss units (100 gloss units corresponding to the gloss value of a black glass standard), a difference of a few gloss units can easily be noticed by the human eye, in particular a difference of 2.0 gloss units. It has been found that when moulding the elastomeric layer against a smooth mould surface, in particular so that the outer surface has a roughness Ra as defined in DIN EN ISO 4287:1998 (in combination with ISO 11562:1996 specifying the Gaussian phase correct filter to filter out the fine roughness profile) of less than 10 μm, the gloss value of the outer surface is at least 2 to 3 gloss units higher than the rougher textured outer surface, and may comprise for example 4 gloss units for an elastomeric polyurethane layer.

In an embodiment of the skin according to the present invention, said skin comprises an inner layer adhered to the inner surface of said outer layer with said operating element, which preferably comprises a sensor element and a light source, being embedded in between said outer and said inner layer.

An advantage of this embodiment is that the operating element is entirely shielded off from dust or humidity. Moreover, the operating element can easily be integrated completely when moulding the two skin layers against the mould surface. The operating element is thus protected against any damage when transferring the skin to the next mould, in particular a backfoam mould, wherein the substrate is adhered to the back of the skin through the intermediary of a foam layer.

The operating element may comprise a mechanical switch element that has two stable positions. In an embodiment of the skin according to the present invention, the operating element comprises however a sensor element. Such a sensor element may be more reliable and compact than a bi-stable mechanical on/off switch. The sensor element may be a contact sensor, for example a resistive sensor or a pressure sensor, but it may also be a remote sensor, for example a capacitive sensor, an infrared sensor or an electromagnetic sensor enabling for example to read RFID data.

Preferably, the operating element additionally comprises a light source. This light source is preferably activated upon operation of the operating element.

In an embodiment of the skin according to the present invention, the visible surface of the skin in said first area and in said second area is formed by one and the same material.

The elastomeric layer may be produced of one material or may additionally comprise a coating layer applied by an in-mould coating process, thus forming the outer surface of the (composite) outer elastomeric layer. The visible surface is thus formed, both in the first and in the second area, by the single material of the outer layer or by the coating layer. No coating layer has thus to be applied separately to the first or to the second area, or no part of a coating layer has to be removed for example by means of a laser, to indicate the location of the first area within the second area. The visible outer surface of the skin is thus formed in one step, preferably against a mould surface when moulding the skin.

The present invention also relates to a vehicle trim part which comprises a skin according to the invention, which skin is adhered to a substrate layer, in particular through the intermediate of a foam layer.

The present invention finally also relates to a method for producing a skin according to the invention, which method comprises the steps of:

moulding said outer elastomeric layer with its outer surface against a mould surface, which mould surface is provided with a negative of said first surface texture to produce said first surface texture on the outer surface of said outer elastomeric layer and with a negative of said second surface texture to produce said second surface texture on the outer surface of said outer elastomeric layer; and adhering said operating element to the inner surface of said outer layer.

An advantage of this method is that the different textures of the visible surface of the skin, and optionally the relief element or elements which further indicate the location of the operating element, are immediately obtained, in one step, during the moulding process.

In a preferred embodiment of the method according to the present invention, it comprises the further step of embedding said operating element between said outer layer and an inner layer, which inner layer is adhered to the inner surface of said outer layer after having positioned said operating element against the inner surface of said outer layer and which operating element preferably comprises a sensor element and a light source.

Producing the skin in two layers is already done in practice. Reference can be made for example to EP 2 024 413 wherein the outer layer is made of a light-stable aliphatic polyurethane material and the inner layer by a more flexible aromatic polyurethane material. The operating element can easily be embedded, in the correct location, between the two layers by positioning it on the back of the first layer before spraying the second layer.

Other advantages and particularities of the present invention will become apparent from the following description of some particular embodiments of the skin and the method for producing it according to the invention. This description is only given by way of example and is not intended to limit the scope of the invention. The reference numerals used in the description relate to the annexed drawings wherein:

Figure 3:
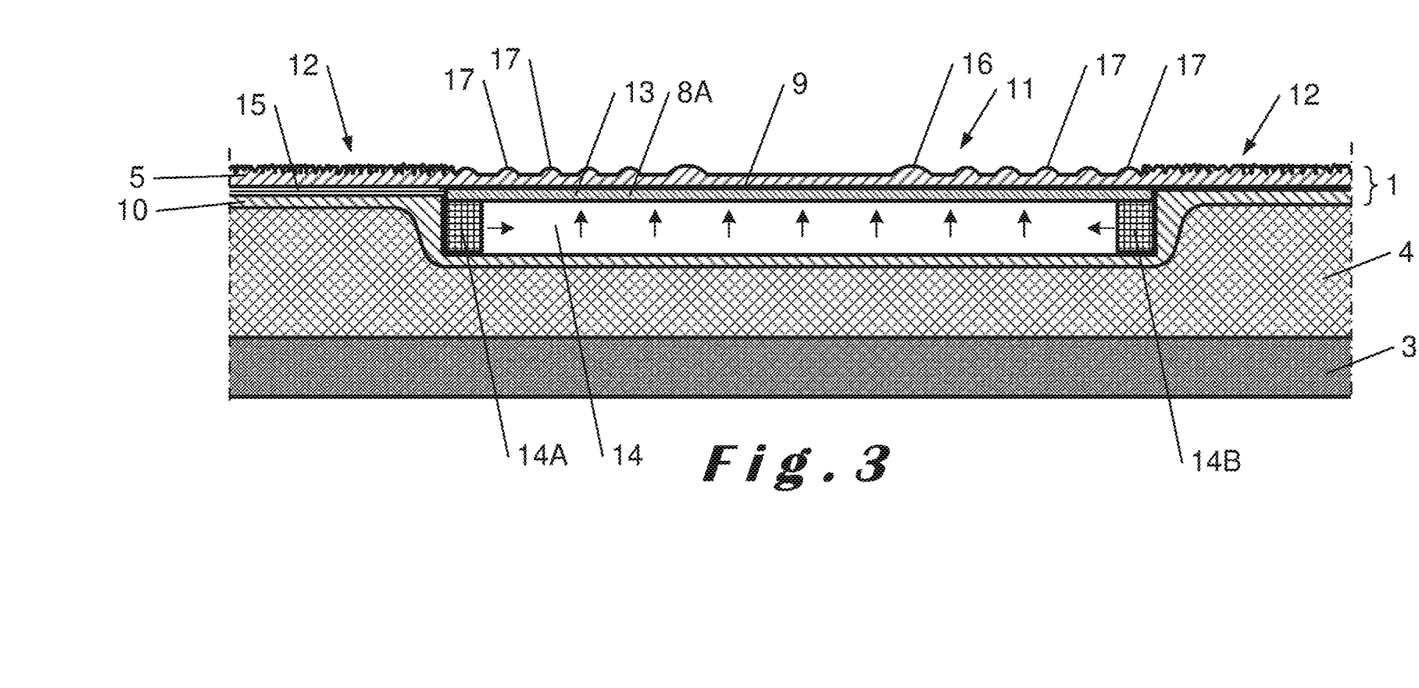
FIG. 3 is a schematic cross-sectional view through the trim part at the location of the pressure sensitive switch sensor.

The invention generally relates to a skin 1 for a vehicle interior trim part 2 such as a dashboard, a door panel, a console, a lid of a glove compartment, etc. As can be seen in FIG. 3, the trim part comprises the skin 1 which is adhered to a rigid substrate layer 3. The skin 1 can be adhered directly to the substrate layer 3, by means of an adhesive or by means of an overmoulding process wherein the skin 1 is moulded, in a mould, over the substrate layer 3. Preferably, the skin 1 is adhered to the substrate layer 3 through the intermediary of a foam layer 4. This foam layer 4 can be produced by a moulding process in between the skin 1 and the substrate layer 3.

The skin 1 according to the present invention comprises at least a flexible outer elastomeric layer 5, with an inner surface 6 and an outer surface 7 which forms the visible surface, i.e. the A-surface, of the skin 1. The outer elastomeric layer 5 may be a thermoplastic layer or foil, in particular a TPE (thermoplastic elastomer) layer such as a TPO or a PVC skin. Such thermoplastic skin layers can be moulded by a thermoforming process or for example by a slush moulding process. The elastomeric outer skin layer 5 can also be made starting from a curable composition, in particular a curable polyurethane composition. This curable composition is a flowable material which is applied onto a mould surface and which is allowed to cure on that mould surface to produce the outer elastomeric skin layer 5.

The curable composition can either be applied by a spray process against the surface of an open mould or it can be applied in a closed mould, more particularly poured but preferably injected in accordance with a reaction injection moulding (RIM) process. Use can be made of a light-stable coloured PU reaction mixture. Reference can be made to EP-B-0 303 305, EP-B-0 379 246, WO 98/14492, EP-B-0 929 586 and WO 04/000905, which are included herein by reference.

In a variant embodiment, a finishing layer, in particular a light-stable paint or a so-called in-mould coating, either water or solvent-based, can be applied as a first coating layer against the mould surface. This paint composes together with the elastomeric layer subsequently applied thereto, the outer elastomeric skin layer 5.

The outer skin layer 5 is elastomeric which means that it has generally an elongation, measured in accordance with DIN/EN/ISO 527-3, of at least 30%, preferably of at least 50%. Its flexural modulus, measured in accordance with ASTM D790-03, is preferably smaller than 100 MPa, more preferably smaller than 75 MPa and most preferably lower than 55 MPa or even lower than 40 MPa. Generally, its overall density is larger than 300 kg/m$^3$, preferably larger than 500 kg/m$^3$ and more preferably larger than 600 kg/m$^3$.

In contrast to the outer skin layer 5, the substrate layer 3 is relatively rigid and has in particular a flexural modulus, measured according to ASTM D790, higher than 500 MPa, preferably higher than 700 MPa. Although the substrate layer can be made of a thermosetting material, the substrate is preferably made of a thermoplastic material. This thermoplastic material is preferably selected from the group consisting of PC (polycarbonate), ABS (acrylonitrile butadiene styrene) and ABS blends, in particular PC/ABS, SMA (styrene maleic anhydride), PPO (polyphenylene oxide), TPO (thermoplastic olefin), in particular PP (polypropylene), polyacetals, in particular POMs (polyoxymethylenes), nylon, polyester, acrylic and polysulfone.

The outer elastomeric skin layer 5 may also be produced in two or more layers which are each produced from a curable composition, as described in WO 2007/137623.

The skin 1 according to the present invention comprises moreover at least one operating element 8 which has an operating surface 9 and which is adhered to the inner surface 6 of the outer elastomeric layer 5. In the present text and claims, the term operating element indicates an element which is configured to be connected to an electric or electronic component to enable a user to control the operation of this component.

To adhere the operating element 8 to the outer layer 5, the operating element 8 can be adhered thereto by means of an adhesive or it can be applied thereto during the production of the outer layer, when the material of the outer layer 5 has not yet completely cured. It is also possible to apply the operating element 8 onto the substrate layer 3 and to overmould the operating element 8 together with the substrate layer 3 with the liquid material used to produce the outer layer 5.

In the embodiment illustrated in FIG. 3, the operating element 8 is adhered to the outer elastomeric layer 5 by means of an inner elastomeric layer 10 which is produced against the inner surface of the outer elastomeric layer 5. The inner elastomeric layer 5 may have a same composition and may be produced in a same way as described hereabove for the outer elastomeric layer 5. In particular, both layers 5 and 10 can be produced as disclosed in WO 2007/137623. The outer elastomeric layer 5 is preferably produced by applying a first curable polyurethane composition onto the mould surface and the inner elastomeric layer 10 by applying a second curable polyurethane composition onto the back of the outer elastomeric layer 5. The first curable polyurethane composition is preferably an aliphatic polyurethane composition whereas the second curable polyurethane composition is preferably an aromatic polyurethane composition.

Figure 1:
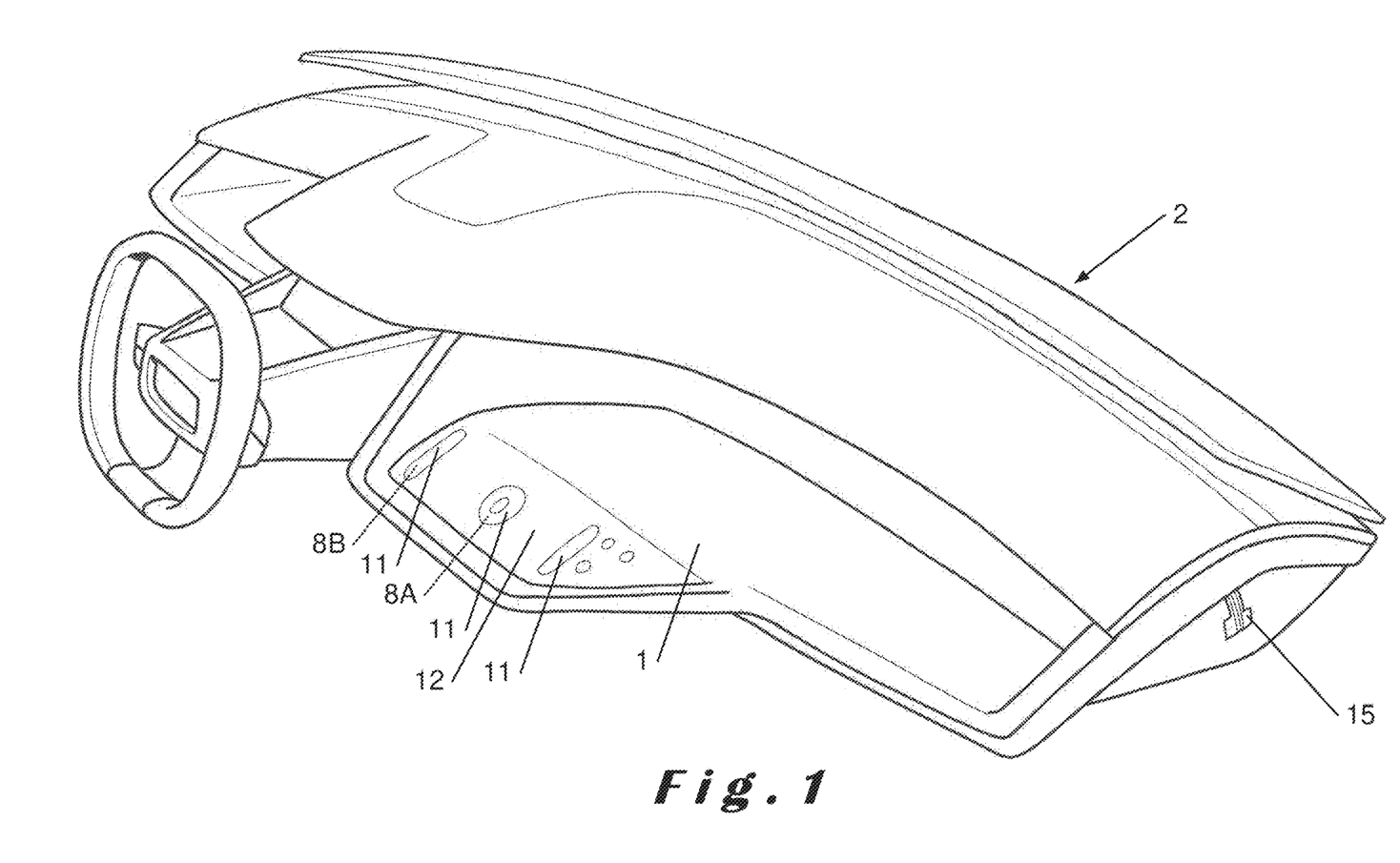
FIG. 1 is a schematic perspective view on a trim part, in particular a dashboard, which contains an elastomeric skin according to an embodiment of the present invention.

The trim part 2 illustrated in FIG. 1 is a dashboard. The dashboard 2 comprises an elastomeric skin 1 which comprises openings to integrate functional elements such as an instrument panel in the skin 1. The skin 1 comprises also an area wherein operating elements 8 are integrated on the back side of the skin so that they are hidden from view. These operating elements 8 may be provided on an electronic printed foil 15 having a tail which sticks out of the trim part 2 so that the operating elements 8 can be connected to a controller.

To avoid deformations in the area of integration when the product is exposed to different environment temperatures, the integrated printed foil has preferably a shrinkage factor similar to the elastomeric skin and/or the E-modulus (Young's modulus) should be the same or smaller than the E-modulus of the elastomeric layer. A printed foil of TPU material is very appropriate to be used in combination with elastomeric materials.

The electronic printed foil can already be foreseen of electronic surface mounted devices, like LEDs, haptic actuators, an electric coil for contactless charging, an RFID reader, an antenna, etc. The printed foil can be as well an OLED display.

A first operating element 8A may be intended to switch on the lighting behind other hidden operating elements so that they become visible. It comprises an on/off switch formed by a pressure sensor 13 which has an operating surface 9. The first operating element 8A also comprises a light source 14 with two opposite LEDs 14A and 14B. The space between the LEDs is filled with a light guiding material which diffuses the light of the LEDs in different directions to create a uniform lighting of the first area 11. The light source 14 can additionally be covered completely or partially by a light filter which filters out certain wavelengths, e.g. to show a coloured image. Such light filters also form part of the light source 14 as they determine the wavelengths of the light which is supplied by the light source 14 to the inner surface 6 of the outer elastomeric layer 5. The LEDs 14A and 14B are energized upon initial actuation of the pressure sensor 13 to have a visual indication of the actuation of the operating element 8A and to have a clearer view on the location of the first operating element 8A. Also the light sources of other hidden operating elements 8 may be energized upon actuation of the first operating element 8A so that they become visible to the user.

To indicate the location of the first operating element 8A when its light source 14 is not energized, the operating surface 9 of the first operating element 8A is located in a first area 11 of the visible surface of the skin 1 which is surrounded by a second area 12 of this visible surface. At least a portion of the first area 11 has a first surface texture which is different from the surface texture of the second area 12, i.e. from the second surface texture.

Usually, the second surface texture is present over the main part of the surface of the skin. This second surface texture may for example be a leather texture or any other texture that is used for trim parts. Such a leather texture has been illustrated on a larger microscopic scale in FIG. 4. It has quite deep valleys and quite high peaks and the surface forming the peaks and the valleys is also quite rough. The Ra value (roughness value), measured as defined in DIN EN ISO 4287:1998 (the arithmetical mean deviation of the assessed texture profile), comprises for example 54 µm whilst the Pt value, i.e. the total height of the profile measured as defined in DIN EN ISO 4287:1998 (the sum of the height of the largest profile peak and the largest profile valley depth within the evaluation length), comprises for example about 220 µm. The root mean square slope value, in particular the delta q value Rdq as determined in accordance with DIN EN ISO 4287:1998, is for example equal to about 1.27. The larger the delta q value, the steeper the slopes of the profile and the more diffuse reflection of the light, and thus the matter the surface. A higher roughness also causes a matter surface. Due to these parameter values of the second surface texture, and the reflection coefficient of the polyurethane material from which the skin is made (by a spray process against a textured mould surface), the gloss value of the skin 1 described hereabove and illustrated in FIG. 4 comprises about 0.2 gloss units in the second area 12 thereof.

Figure 4:
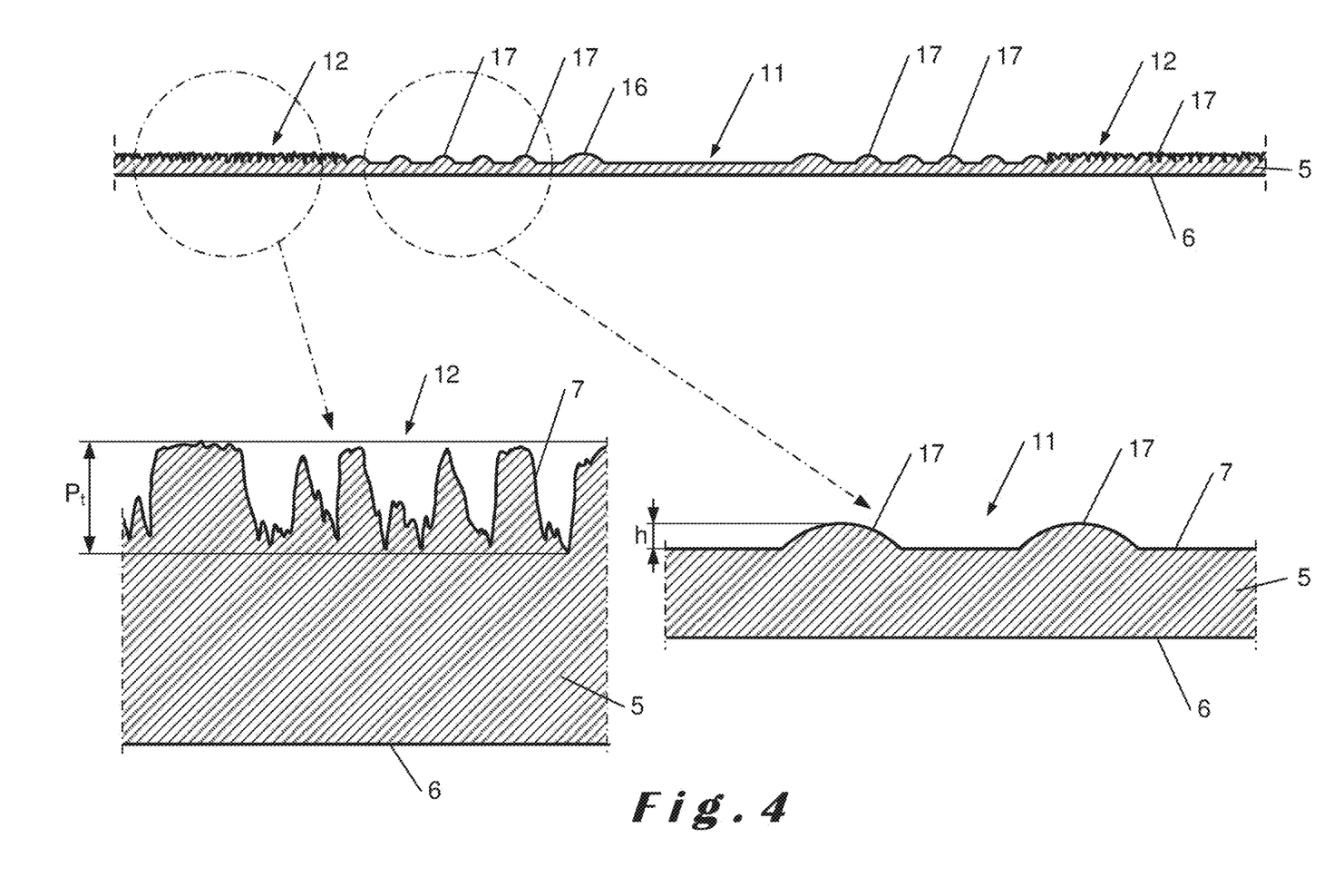
FIG. 4 is an enlarged schematic cross-sectional view through the outer layer of the skin at the location of the pressure sensitive switch sensor.

As illustrated in FIG. 4, the first surface texture is preferably smoother than the second surface texture. In this way, the surface of the first skin area 11 has a higher gloss than the surface of the second skin area 12. This means that the specular light reflection is higher and the diffuse light reflection is lower in the first skin area 11 than in the second skin area 12. This assists in making the first skin area 11 visible within or next to the second skin area 12. The difference in gloss between the first and the second skin area can be measured in accordance with ASTM D523-14(2018). Usually this is done under an angle of 60° but, for low gloss values, a different gloss value can be determined more clearly when measuring it under an angle of 85° (which results in higher gloss values).

The first surface texture may be produced against a completely smooth mould surface, i.e. against a non-textured mould surface which may even be polished. Depending on the skin material, the surface of the skin will be smoother or less smooth. When the skin material is applied in a liquid form against the mould surface, the viscosity thereof may for example have an effect on the smoothness of the resulting skin surface. The obtained gloss of the skin surface depends also on the composition of the skin material. For a polyurethane skin made by spraying a curable polyurethane material against a mould surface, the gloss value may be comprised for example between 3 and 6 gloss units. If a higher gloss is desired, an in-mould coating can first be applied onto the mould surface, for example a lacquer.

In order to indicate the location of the first operating element even more clearly without illumination, surface relief elements are provided in the first surface area, i.e. at the location of the first operating element 8A. These surface relief elements comprise a central icon 16, indicating the on/off switching function, surrounded by circles of dots 17 which do not only form a clear visual indication but also a clear tactile indication of the location of the first operating element 8A. The dots 17 are in fact similar to the raised-points of braille but they are even larger so that they can also be felt easily by unexperienced users. Within the circular icon 16, the surface of the skin is completely smooth so that the recessed area within the circular icon 16 can be clearly felt to indicate the user where he has to push to actuate the first operating element 8A.

In the cross-section illustrated in FIGS. 3 and 4, it can be seen that the icon 16 and the dots 17 have a height h, or provide in other words a height difference h, which is of a same order of magnitude than the total profile height Pt of the second surface texture and which is in particular comprised between 0.15 and 0.2 mm. This height difference corresponds to an increased thickness of the outer elastomeric layer 5 at the location of the icon 16 or the dots 17.

In an alternative embodiment, the icon 16 and/or the dots 17, could be formed by corresponding depressions in the outer surface 7 of the outer skin layer 5, instead of by elevations.

Figure 2:
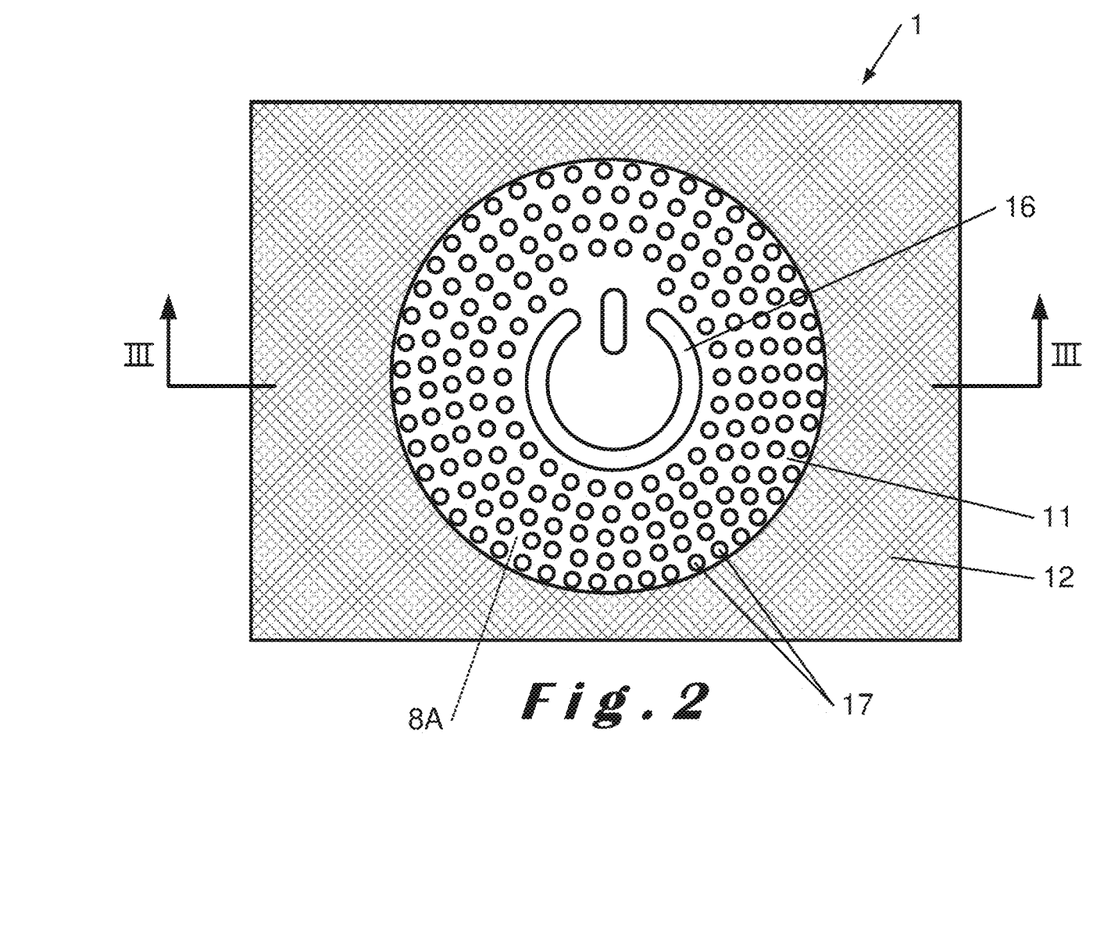
FIG. 2 is an enlarged schematic front view on a portion of the skin at the location of a first operating element, i.e. at the location of a pressure sensitive switch sensor.

In the embodiment illustrated in FIGS. 2 to 4, the gloss difference between the first 11 and the second surface area 12 is maximally since not only the skin surface next to the dots 17 and next to the icon 16 is completely smooth but also the surface of the dots 17 and of the icon 16 itself. In an alternative embodiment, the surfaces of the dots 17 and of the icon 16 could be made rougher so that the dots 17 and the icon 16 are matter and are easier to feel. When they have a smooth surface, due to the oblique sides of the dots 17 and the icon 16, they reflect the light in different directions which assists in their visibility.

Figure 5:
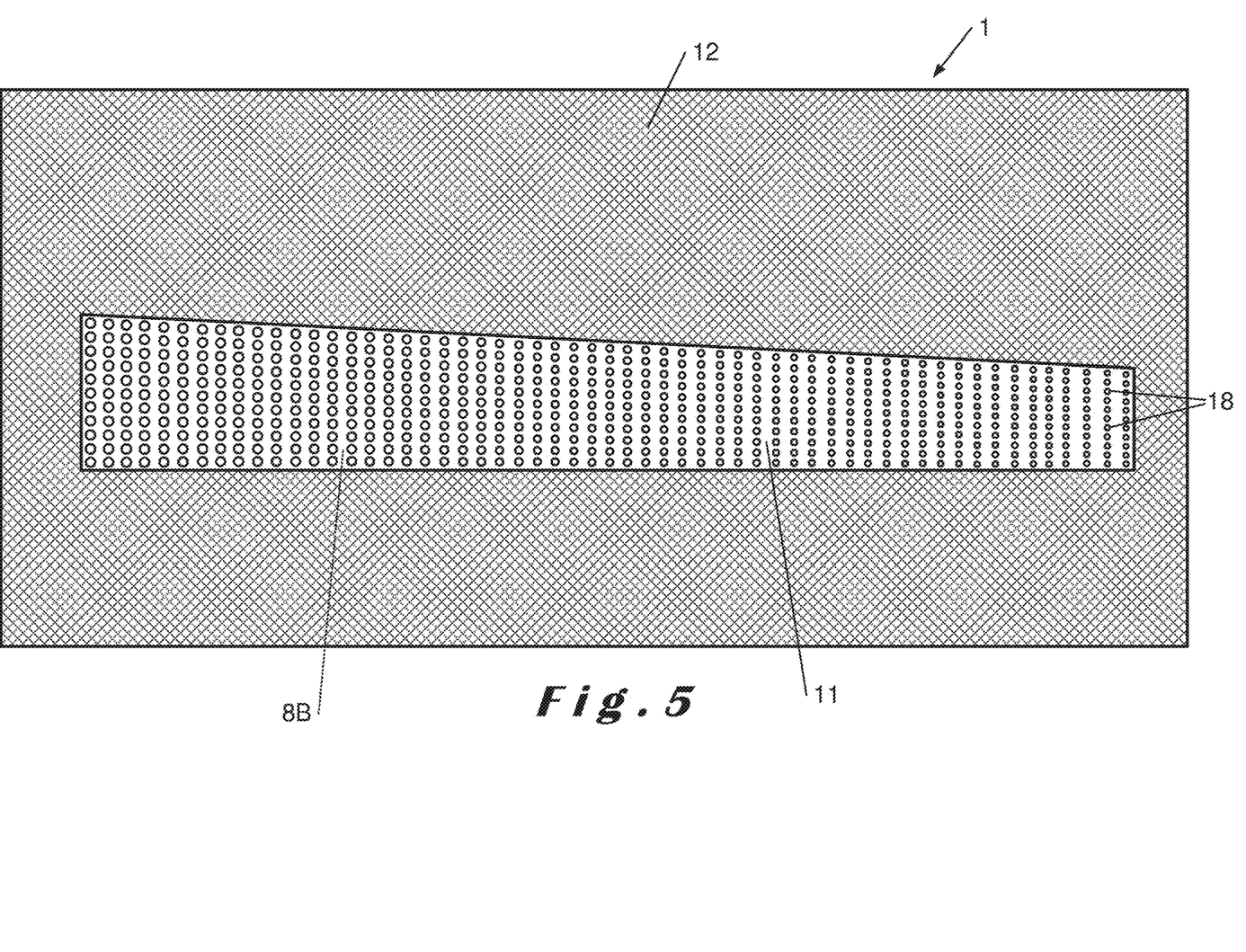
FIG. 5 is an enlarged schematic front view on a portion of the skin at the location of a second operating element, i.e. at the location of a sensor element forming a slider.

FIG. 5 illustrates the surface of the skin 1 at the location of a second operating element 8B. This element 8B comprises an elongated sensor element which enables to detect the position of the user's finger and any sliding movement thereof. Such a slider enables therefore to control for example the volume of the radio, the temperature, the fan speed, opening and closing of the windows, etc. The first surface area has again a smooth surface texture and is provided with dots 18 which have a same shape as the dots illustrated in FIG. 4. More particularly they have a rounded dome-shape so that the user can slide with his finger easily over the first area 11. The dots 18 also have a smooth surface and also in between the dots 18 the first surface area 11 is smooth. The first surface area 11 having an elongated form with a narrowing width, thus forming a sign that by sliding the finger to the narrower side the value of the parameter controlled by the second operating element 8B is reduced, whereas when the user slides his finger to the wider side the value of the parameter controlled by the second operating element 8B is increased.

The invention claimed is:

1. A skin for a vehicle interior trim part, which skin comprises at least an outer elastomeric layer with an inner surface and an outer surface and at least one operating element which is adhered to the inner surface of said outer layer and which has an operating surface, the outer surface of said outer elastomeric layer forming the visible surface of the skin,
wherein the operating surface of said operating element extends-in-under a first area of the visible surface of said skin which is at least partially surrounded by a second area of the visible surface of said skin, the outer surface of said outer layer having in at least a portion of said first area a first surface texture and in said second area a second surface texture which is different from said first surface texture, and said operating element is configured to be connected to an electric or electronic component to control the operation of said component.

2. The skin according to claim 1, wherein the outer surface of said outer elastomeric layer has in said first area at least one surface relief element forming a visible sign indicating the presence of the operating surface of said operating element, which surface relief element comprises at least one depression in said outer surface, where the outer elastomeric layer has a reduced thickness, and/or at least one elevation on said outer surface, where the outer elastomeric layer has an increased thickness.

3. The skin according to claim 2, wherein said depression and/or elevation produces a height difference on said outer surface of at least 0.10 mm.

4. The skin according to claim 2, wherein at least a portion of the surface of said surface relief element has said first surface texture.

5. The skin according to claim 2, wherein the outer surface of said outer layer has in at least a portion of said first area next to said surface relief element said first surface texture.

6. The skin according to claim 2, wherein said surface relief element has a projected surface area on a flat plane tangent to the outer surface of said outer elastomeric layer of at least 1 mm$^2$.

7. The skin according to claim 1, wherein said portion of said first area forms a visible sign indicating the presence of the operating surface of said operating element.

8. The skin according to claim 1, wherein said second surface texture is visually distinct from said first surface texture.

9. The skin according to claim 1, wherein said second surface texture differs from said first surface texture to produce a difference in gloss value between the portion of said first area, which has said first surface texture, and the second area, which has said second surface texture.

10. The skin according to claim 1, wherein said first surface texture is smoother than said second surface texture to provide a higher gloss to the portion of said first area which has said first surface texture, the second area of the skin having a gloss value, measured in accordance with ASTM D523-14 (2018) under an angle of 60°, smaller than 2.0.

11. The skin according to claim 1, wherein said skin comprises an inner elastomeric layer adhered to the inner surface of said outer layer with said operating element being embedded in between said outer and said inner layer.

12. The skin according to claim 1, wherein said operating element comprises a sensor element.

13. The skin according to claim 1, wherein said operating element comprises a light source.

14. The skin according to claim 1, wherein the visible surface of the skin in said first area and in said second area is formed by one and the same material.

15. The skin according to claim 2, wherein said depression and/or elevation produces a height difference on said outer surface of at least 0.15 mm.

16. A vehicle interior trim part comprising a skin according to claim 1, which skin is adhered to a substrate layer, in particular through the intermediary of a foam layer.

17. The vehicle interior trim part according to claim 16, wherein said operating element is connected to an electric or electronic component.

18. A method for producing a skin according to claim 1, which method comprises the steps of:
moulding said outer elastomeric layer with its outer surface against a mould surface, which mould surface is provided with a negative of said first surface texture to produce said first surface texture on the outer surface of said outer elastomeric layer and with a negative of said second surface texture to produce said second surface texture on the outer surface of said outer elastomeric layer; and
adhering said operating element to the inner surface of said outer layer to produce said skin.

19. The method according to claim 18, wherein said operating element is adhered to the inner surface of said outer layer before said outer layer is removed from said mould surface.

20. The method according to claim 18, further comprising the step of embedding said operating element between said outer layer and an inner layer, which inner layer is adhered to the inner surface of said outer layer after having positioned said operating element against the inner surface of said outer layer and which operating element preferably comprises a sensor element and a light source.

* * * * *